Nov. 30, 1926.
W. WRIGHT
CASING SPEAR
Filed Oct. 19, 1923
1,608,828
2 Sheets-Sheet 1
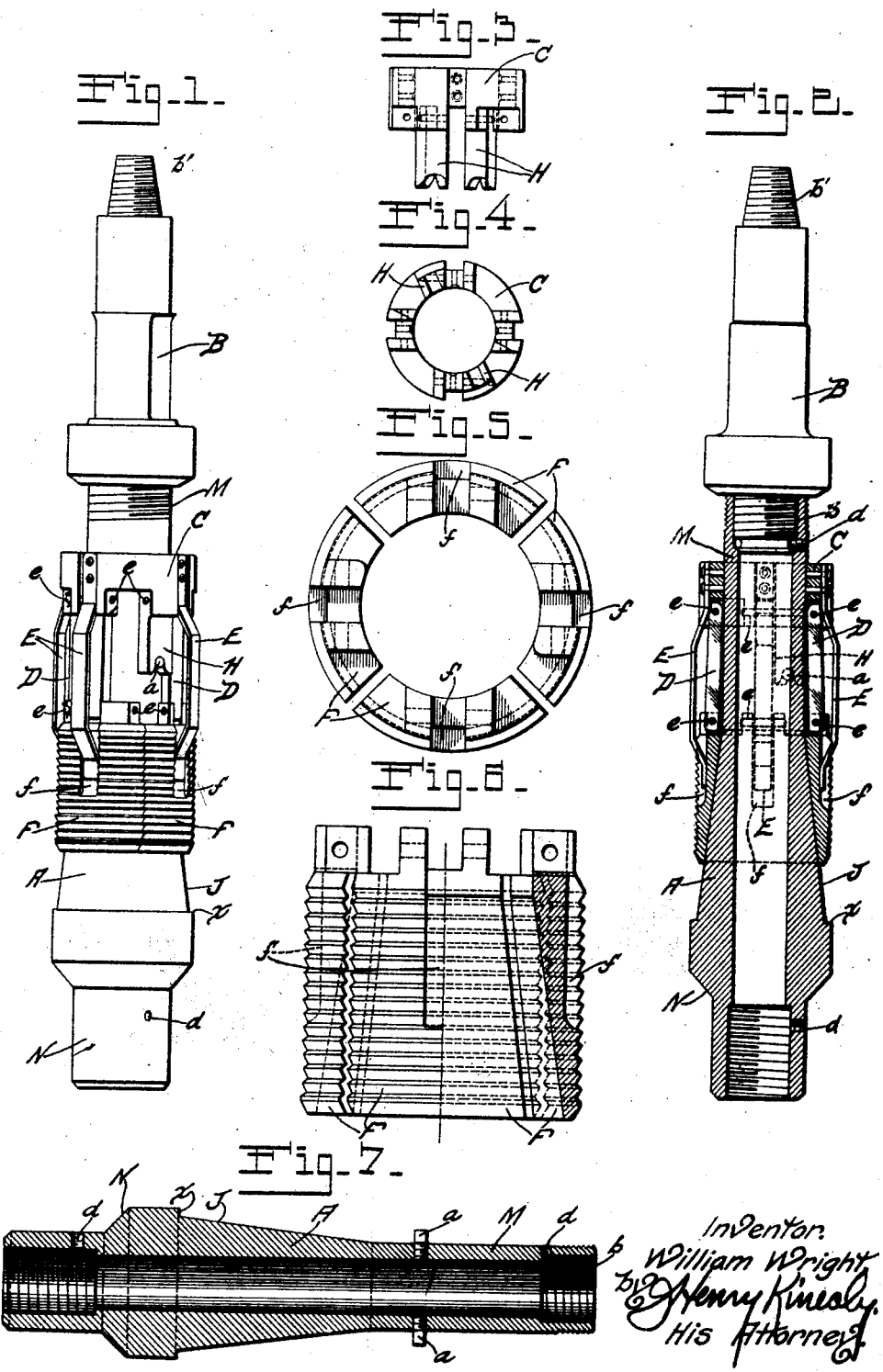
Inventor:
William Wright
by Henry Kinsley
His Attorney Nov. 30, 1926.

W. WRIGHT

CASING SPEAR

Filed Oct. 19, 1923

1,608,828

2 Sheets-Sheet 2

Inventor:
William Wright,
by Henry Kinealy
His Attorney

Patented Nov. 30, 1926.

1,608,828

UNITED STATES PATENT OFFICE.

WILLIAM WRIGHT, OF TULSA, OKLAHOMA.

CASING SPEAR.

Application filed October 19, 1923. Serial No. 669,574.

My invention relates to casing spears and more particularly to casing spears which are used to remove broken sections of casing used in deep wells such as oil wells, Artesian wells, gas wells, or the like, and are used to jar out or jar down jammed sections of such casing.

The objects of my invention are to provide a casing spear which may be put to a number of uses which heretofore have required a plurality of different tools; to provide a casing spear which is reversible and therefore can be used to either jar out or jar down a casing and which can be used as an expanding swage to straighten collapsed or bulged sections of casing; and to provide a hollow casing spear through which an explosive may be lowered to shoot off the casing below the spear.

Figure 9:
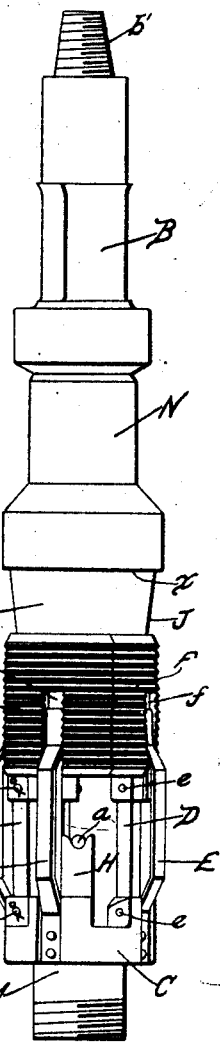
Figure 8:
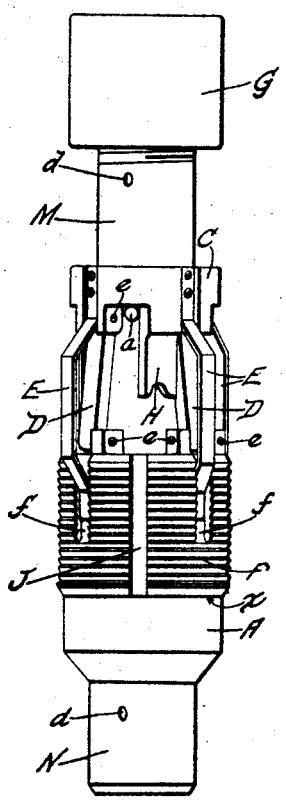
Figure 10:
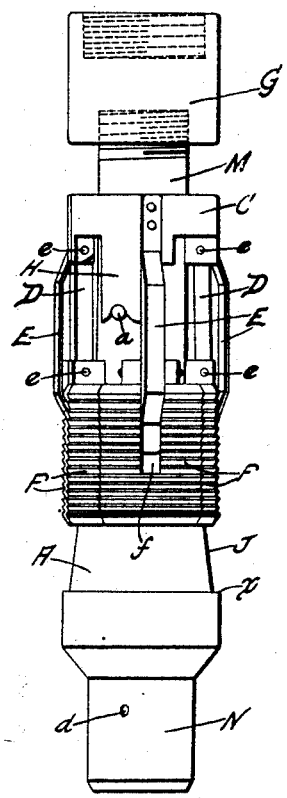
Figure 11:
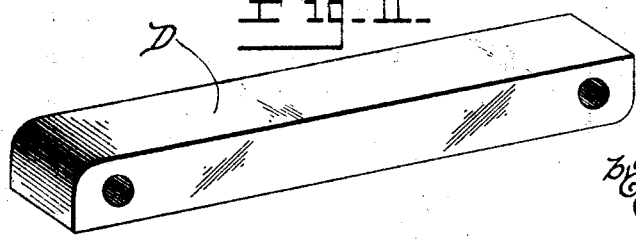

My invention is fully shown in the accompanying drawings wherein similar letters are used to designate similar parts. Fig. 1 shows the casing spear in position to be used as a pull out spear; Fig. 2 shows in section the tool in Fig. 1; Figs. 3, 4, 5, 6 and 7 show in detail parts of the device; Fig. 8 shows the expansible jaws expanded to grip a casing; Fig. 9 shows the tool reversed to be used as a jar down spear; Fig. 10 shows the tool arranged so as to be connected directly to a section of casing; and Fig. 11 shows in detail a part of the device.

Referring to the figures my new improved casing spear has a body member A, shown in detail in Fig. 7, and which comprises the substantially cylindrical shank portion M having the pins $a$ extending from the side thereof as shown in the figure; the frustum of a cone J with the small end thereof abutting the end of the shank portion M; and an end portion N abutting the base of the frustum. For a portion of its length nearest the frustum J the end portion N is of greater diameter than the base of the frustum so as to form the shoulder X at said base. In the embodiment of my invention shown in the drawings the different portions of the body member are formed integral with each other but they may be arranged separable if desired. The body member A is preferably made hollow and the shank portion is preferably threaded for a part of its length internally and externally and the end portion of the body member is preferably threaded for a part of its length internally, all as clearly shown in Fig. 7. A grip member comprising various parts hereinafter described is mounted on the shank portion M of the body member and is movable either longitudinally or circumferentially in relation to said body member. This grip member has the ring C, shown in detail in Figs. 3 and 4, and the expansible jaws F, shown in Fig. 5, connected to the ring by means of links D. The ring C has the lugs H extending therefrom. The lugs have recesses in the lower ends thereof to receive the pins $a$ projecting from the shank portion M of the body member whereby the grip member may be maintained in a fixed relation to the body member. The expansible jaws F are adapted to be expanded to grip the inner wall of a casing by the movement relative thereto of the frustum J of the body member. The links D are, preferably, hingedly mounted on said ring and said jaws by means of pins $e$ which extend through shoulders projecting from said ring and said jaws and through the ends of said links as shown.

Spring members E are, preferably, fastened to the ring C over the links D and each of said spring members extends between said ring and one of the expansible jaws F so as to normally maintain said jaws in collapsed position on said body member. The spring members E, preferably, engage the expansible jaws F in the grooves $f$ provided for that purpose in the face of the jaws. The spring members E are also arranged to project outwardly beyond the body member and grip member to frictionally engage the walls of a casing so that the grip member may be held at rest while said body member is moved relatively thereto, as will be hereinafter described. The contacting surfaces of the expansible jaws F are formed at the same angle as the frustum of the body member so when the frustum is moved relative to the jaws to cause them to expand to grip the wall of a casing the outer faces of the jaws are at all times substantially parallel to the wall.

The sub B having the lower threaded stud $b$ and the upper threaded stud $b'$ may be used to connect the tool to the end of a spear by which it is lowered into the well. The threaded stud $b$ is arranged to engage either the internally threaded part of the shank portion M or the internally threaded part of the end portion N of the body member. The threaded portion $b'$ is arranged to engage the end of any suitable supporting means, not shown, by which the tool is held. The casing connection G is internally threaded to receive the externally threaded part of the shank portion M of the body member and is also threaded to receive the end of a section of casing, as shown in Figs. 8 and 10.

The manner of using the casing spear to accomplish the objects set forth above is as follows:

When it is desired to pull or jar out a casing either the sub B or the casing connection G is affixed to the upper part of the shank portion M of the tool as shown in Figs. 1 and 10. The pins $a$ are inserted into the recesses in the ends of the lugs H extending from the ring C so as to maintain the expansible jaws F in collapsed position on the body member. The tool is then lowered into the casing and the spring members E which project beyond the sides of the tool frictionally engage the inner wall of the casing so that the grip member must be forced downwardly by the body member upon which the grip member is carried. When the tool has been lowered until it is in the section of the casing which is desired to be gripped, the body member is moved relative to the grip member, which is held at rest by the frictional engagement of the springs E on the wall of the casing, to disengage the pins $a$ from the recess in the lugs H thereby allowing the expansible jaws F to be expanded by the frustum J of the body member A when the body member is pulled upwardly so as to be moved longitudinally relative to the grip member. The relative movement of the body member and the grip member to disengage the pins $a$ and the lugs H whereby the jaws are allowed to be expanded comprises first a slight relative longitudinal movement of the two members so as to disengage the pins from the recesses in the lugs and then a relative circumferential movement whereby the pins and the recesses are moved out of longitudinal alignment. The outer faces of the jaws F are preferably provided with a series of teeth, as shown in the figures, which bite into the wall of the casing and thereby obtain a firm hold thereon. The tool is then pulled upwardly and the casing is carried with it.

If a section of casing collapses or bulges into the well the tool may be lowered and the jaws expanded, as described, to exert a pressure on the walls of the casing to straighten it out.

If, when the connection G is used, the casing sticks in the well, a charge of explosive may be lowered to shoot off the casing below the tool.

The links D, are preferably made with the beveled edges, shown in detail in Fig. 11, so that links may be mounted close to the lower edge of the ring C of the grip member and so that if the links D break while the tool is in a casing the broken fragment of the link will be prevented from flying outwardly by the wedging of the edge of the link against the shank portion M. The shoulder X formed at the base of the frustum J of the body member engages the lower edges of the expansible jaws F and prevents them from slipping off the frustum.

When it is desired to jar a section of casing down into position in the well the tool is reversed and the sub B is affixed onto the end portion N of the body member by means of the threaded stud $b$ engaging the internally threaded part of the end portion. The tool is lowered into the well and the expansible jaws F are expanded by the frustum J of the body member to grip the casing in the same manner as if the tool were used in the manner first described above. Set screws $d$ may be used to keep the sub B from turning in the threaded parts of the shank portion M and end portion N, after the sub has been screwed into proper position therein.

I do not intend to limit myself to the exact details of construction or the exact embodiment of my invention shown in the drawings since the form and arrangement of the different parts may be varied within wide limits without deviating from the spirit of my invention.

What I claim as new and desire to secure by Letters Patent, is:—

1. A casing spear comprising a body member and a grip member carried by said body member and movable either longitudinally or circumferentially thereof, said grip member comprising a ring, a plurality of expansible jaws, links connecting said ring and said jaws, and spring members extending between said ring and said jaws, whereby said jaws are normally maintained in collapsed position on said body member, said body member and said grip member being constructed and arranged so that said jaws are expanded by a longitudinal movement of said body member and said grip member relative to each other.

2. A casing spear comprising a hollow body member and a grip member carried by said body member and movable either longitudinally or circumferentially thereof, said grip member comprising a ring, a plurality of expansible jaws, links connecting said ring with said jaws, and springs extending between said ring and said jaws whereby said jaws are normally maintained in a collapsed position on said body member, said members being constructed and arranged whereby said jaws are expanded by a longitudinal movement of said members relative to each other.

3. A casing spear comprising a hollow body member threaded internally at both ends thereof and having a pin projecting from the side thereof, and a grip member carried by said body member and movable either longitudinally or circumferentially thereof, said grip member comprising a ring provided with a lug having a recess therein to receive said pin whereby said members are locked against longitudinal movement relative to each other, a plurality of expansible jaws, links connecting said jaws to said ring, and spring members adapted to frictionally engage the walls of a casing whereby said grip member will be held at rest while said body member is moved relatively thereto, said body member and said grip member being constructed and arranged so that said jaws are expanded by a longitudinal movement of said members relative to each other.

4. A casing spear comprising a body member and a grip member carried by said body member and movable either longitudinally or circumferentially thereof, said grip member comprising a ring, a plurality of expansible jaws, links connecting said jaws to said ring, spring members extending between said ring and said jaws for normally maintaining said jaws in a collapsed position and adapted to frictionally engage the walls of a casing, and said body member and said grip member being constructed and arranged so that said jaws are expanded by a longitudinal movement of said members relative to each other, and means carried by said body member adapted to cooperate with means carried by said grip member whereby said members may be locked in fixed relative position.

5. A casing spear comprising a body member and a grip member, said body member having in substantially axial alignment a substantially cylindrical shank portion, a frustum of a cone having the small end thereof abutting said shank portion, and an end portion abutting the base of said frustum, said grip member being mounted on said shank portion and movable longitudinally thereof and comprising a ring, a plurality of expansible jaws adapted to engage said frustum and to be expanded thereby when said grip member is moved longitudinally relative to said body member toward said frustum, and spring members extending between said ring and said jaws whereby said jaws are normally maintained in collapsed position.

6. A casing spear comprising a body member and a grip member, the body member having in substantially axial alignment a substantially cylindrical shank portion having a pin projecting from the side thereof and being threaded internally and externally, a frustum of a cone arranged with its small end abutting said shank portion and having a shoulder formed at the base thereof, and an end portion threaded internally and abutting the base of said frustum, said grip member being mounted on said shank portion and movable longitudinally and circumferentially thereof and comprising a ring provided with a lug having a recess therein adapted to receive said pin projecting from the side of said shank portion of said body member, a plurality of expansible jaws adapted to engage the surface of said frustum, the contacting surfaces of said jaws and said frustum being formed at the same angle, links connecting said jaws to said ring, spring members for normally maintaining said jaws in collapsed position and adapted to frictionally engage the walls of a casing whereby said grip member may be held at rest while said body member is moved relatively thereto.

In witness whereof I have signed my name to this specification.

WILLIAM WRIGHT.